United States Patent

Auger

[11] Patent Number: 6,115,696
[45] Date of Patent: Sep. 5, 2000

[54] TRANSPORT INSTRUCTION MANAGEMENT AND DISTRIBUTION NETWORK

[76] Inventor: Lucien Auger, 19, Grande-Rue, Le Pre-Saint-Gervias, France, F93310

[21] Appl. No.: 08/952,374
[22] PCT Filed: May 3, 1997
[86] PCT No.: PCT/FR96/00678
  § 371 Date: Mar. 19, 1998
  § 102(e) Date: Mar. 19, 1998
[87] PCT Pub. No.: WO96/35184
  PCT Pub. Date: Nov. 7, 1996

[30] Foreign Application Priority Data

May 5, 1995 [FR] France .................................. 95 05382

[51] Int. Cl.[7] .................................................. G06F 17/60
[52] U.S. Cl. ............................ 705/28; 705/407; 705/410; 705/1
[58] Field of Search ................ 705/1, 5–6, 8–9, 705/14, 18, 22, 26, 28–29, 401, 404, 407, 410

[56] References Cited

U.S. PATENT DOCUMENTS

| 4,799,156 | 1/1989 | Shavit et al. ........................... 364/401 |
| 5,227,874 | 7/1993 | Von Kohorn ............................ 705/10 |
| 5,586,037 | 12/1996 | Gil et al. ................................ 705/407 |
| 5,592,477 | 1/1997 | Farris et al. ............................ 370/396 |
| 5,602,742 | 2/1997 | Solondz et al. ....................... 364/464.2 |
| 5,758,329 | 5/1998 | Wojcik et al. .......................... 705/28 |

FOREIGN PATENT DOCUMENTS

| 0209392A3 | 1/1987 | European Pat. Off. ........ G06F 15/22 |
| 4019890A1 | 1/1992 | Germany ......................... G06F 15/24 |
| 2202644 | 8/1988 | United Kingdom ............. G06K 7/14 |

*Primary Examiner*—James P. Trammell
*Assistant Examiner*—Cuong H. Nguyen
*Attorney, Agent, or Firm*—Arthur L. Plevy; Buchanan Ingersoll PC

[57] ABSTRACT

The invention proposes a network for managing orders (Oi) for carriage issued by user-clients (Ci) and carried out by carriers (Ti) which includes a central processing unit (UC) linked to the users (Ci) for the receipt and management of orders (Oi) for carriage and, in particular, the distribution of these orders to the various terminals (Bi), each one of which includes a peripheral processing unit (UP) linked to the central processing unit (UC) and means:

for identifying the carriers (Ti);
 for exchange (14) of data between the terminal (Bi) and the approved carriers (Ti);
 for displaying (16) orders (Oi) to be carried out;
 for printing (18) and issuing, to a carrier (Ti), slips corresponding to orders to be carried out; these means (12, 14, 16, 18) being linked to the peripheral processing unit (UP).

Application, in particular, to the management of a messenger network.

10 Claims, 2 Drawing Sheets

TRANSPORT INSTRUCTION MANAGEMENT AND DISTRIBUTION NETWORK

This application is a 371 of PCT/FR96/00678 dated on May 03, 1996.

The invention relates, in particular, to a network for distributing and managing orders issued by user-clients and carried out by carriers.

Carrying out an order for carriage, for example an errand carried out by a messenger, requires the user-client to be able to place his order as simply and effectively as possible with a service provider who is responsible for the order received being carried out satisfactorily.

To this end, the service provider must have at his disposal a fleet of carriers, for example messengers, with whom he can enter into contact in order to communicate to them the technical data relating to the various errands to be carried out.

These data relate, in particular, to pickup and delivery addresses and times and also to the type of parcel or envelope to be carried.

In addition to these conventional technical operations of managing each order received, with a view to its being carried out by one of the fleet's carriers, the service provider must also manage the orders in financial terms with a view to their being paid for by the clients and manage the fleet members in financial terms with a view to its members being paid for the orders they have carried out.

Most commonly, the service provider receives the orders to be carried out, via the telecommunications network, for example via telephone or via fax, which originate from user-clients.

In order to ensure the smooth running and satisfactory economic management of his company and, in particular, to avoid non-payment in the future, user-clients must have been previously identified and registered by the service provider as clients authorized to transmit orders for carriage.

Receipt of a first order originating from a new client does not therefore immediately give rise to the order being carried out because the service provider will wish to verify the identity and possibly the solvent financial status of this new client, a delay such as this not being conducive to fulfilling a new client's immediate need.

When an order for carriage is received, originating from an authorized and recognised client, the service provider must, on the basis of the pickup or collection and delivery addresses and timescales, determine which of the members of his fleet of carriers is capable of carrying out this order with the desired efficiency and precision.

Currently, the orders received by the service provider are distributed "empirically" and this procedure relies, for its efficiency, on the service provider's know-how and on the competence and integrity of the members of the fleet with whom the service provider is generally in communication by radio or by telephone.

In particular, when the service provider is in communication with a messenger, he actually has no way in which to monitor the geographical location of this messenger at the time when he is in contact with him and he is thus unable to verify "a priori" whether the messenger will be capable of making the collection on time.

In order to ensure that his services are as efficient as possible, the provider will also wish to have at his disposal the largest possible fleet of carriers, for example messengers.

It is thus desirable for the service provider to be able to call upon the largest number possible of carriers while at the same time being able to check the identity of each carrier (whether an individual or a company), the type and suitability of their carriage equipment, and the fact that these carriers have complied with legal provisions, particularly provisions relating to labour law and carriage law.

Finally, economic and financial management, both with regard to user-clients and to the various carriers who are members of the fleet, requires the ability to automate the various verification, invoicing and payment operations as far as possible, particularly by using computerized means.

The object of the invention is to propose a design for a network, for distributing and managing orders for carriage, which makes it possible to solve the various problems just referred to.

To this end, the invention proposes a network which includes a central processing unit linked to the users for the receipt of orders for carriage to be carried out, the management of the orders received and, in particular, the distribution of these orders to the various terminals distributed geographically, each one of which is linked to the central unit and/or to the users and each one of which includes a peripheral processing unit linked to the central unit and:

means for identifying approved carriers capable of carrying out the orders;

means for exchange of data between the terminal and the approved carriers;

means for displaying one or more orders for carriage to be carried out;

means for printing and issuing, to an approved carrier, slips corresponding to orders for carriage to be carried out by this carrier; these means being linked to the peripheral processing unit.

According to other characteristics of the invention:

the identification means include a device for reading and/or writing data on a contact-type integrated-circuit identification card, also known as a smart card, held by each approved carrier;

the identification card includes data relating to the identity of the approved carrier holding the card and data relating to the number of times of access to the terminals which the carrier has had and/or to a number of orders which the carrier is still authorized to carry out under the terms of a prior subscription payment made by the carrier to the body managing the network;

the means for exchange of data include a keyboard enabling an identified approved carrier to select at least one of the orders to be carried out which are displayed on the terminal and to command the issuing of a slip relating to this order;

the means for exchange of data enable an approved carrier to communicate with the central processing unit, particularly in order to issue messages to the central processing unit and/or a user-client;

the display means include a screen for displaying the orders for carriage to be carried out, particularly in chronological order of receipt of the orders by the peripheral processing unit, with, in particular, for each order:

the pickup address and time;

the delivery address and time;

an indication of the nature of the carriage, particularly of a category of dimensions and/or of weight to which a parcel to be carried belongs or of a type of vehicle required for carriage;

each slip relating to an order for carriage to be carried out includes at least the following information:

the identity of the approved carrier who carries out the order for carriage;

the identity of the user-client issuing the order;

the pickup address and time;

the delivery address and time;

an indication of the type of carriage;

an encoded representation of such information, particularly in the form of a bar code, with a view to facilitating processing of the information by the body managing the network, after the order has been carried out by a carrier;

the identification card of an approved carrier includes data relating to the type of carriage he is authorized to carry out;

the peripheral processing unit selects and displays the orders to be carried out which correspond to carriage for which the approved and identified carrier is authorized;

each terminal includes means, which are visible from a distance, for bringing attention to the existence of at least one order for carriage to be carried out.

Further characteristics and advantages of the invention will become apparent on reading the following detailed description with regard to which, for the purposes of comprehension, reference will be made to the appended drawings, in which:

FIG. 1 shows, in dot-dash lines, a network or grid pattern 10 of a geographical area in which carriage operations are to be carried out.

Figure 1:
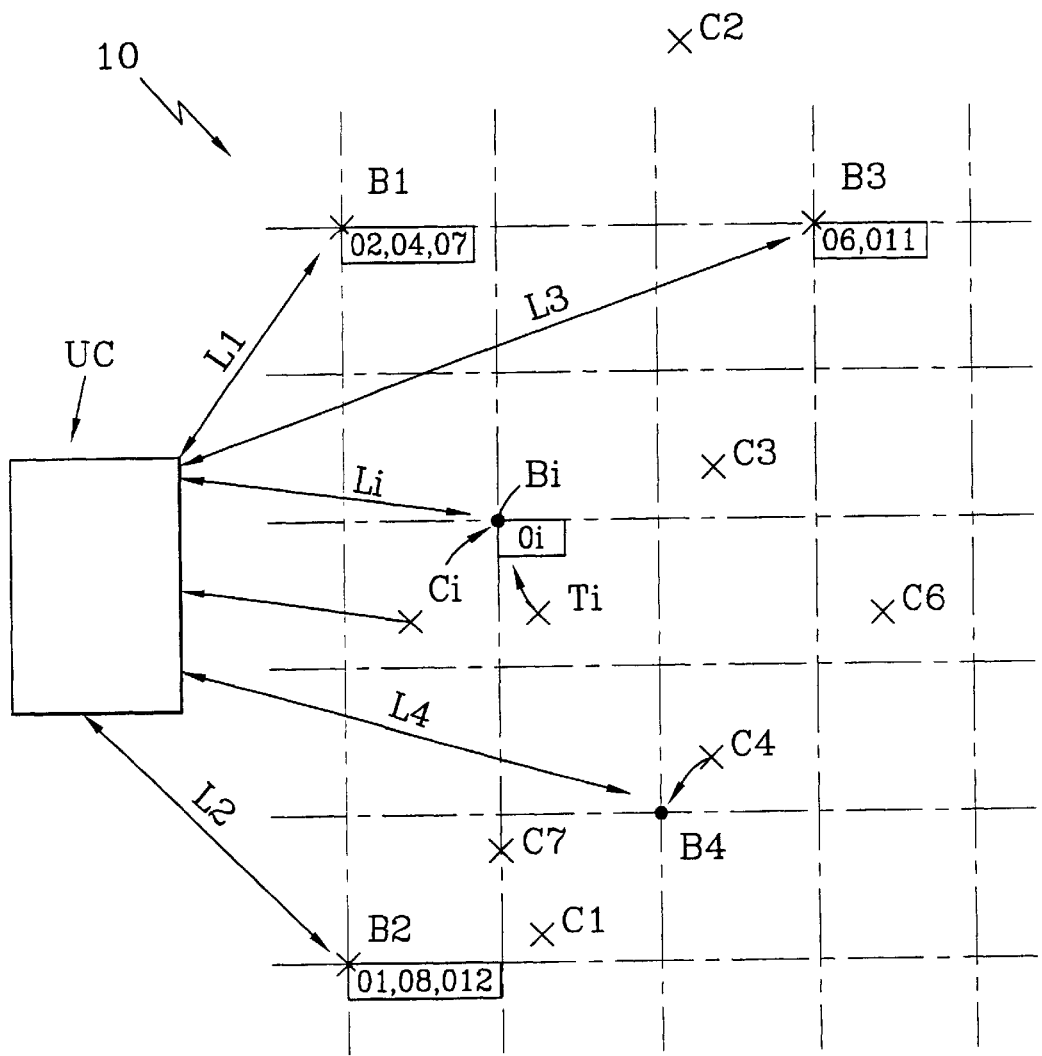
FIG. 1 is a diagram illustrating the design of a network in accordance with the teachings of the invention.

In accordance with the teachings of the invention, the carriage to be carried out is managed by a service provider via a network consisting essentially of a central processing unit UC and of terminals Bi distributed geographically in the region of the network 10, for example at particular points of intersection between the various vertical and horizontal lines (when looking at FIG. 1) of the network 10.

The central processing unit (UC) is a computerized processing unit located at the premises of the service provider managing the network and is permanently linked to the terminals Bi, for example by telephone-communication lines Li.

The central processing unit (UC) is therefore permanently capable of a two-way exchange of data with the various terminals Bi.

The central processing unit (UC) is capable of receiving orders for carriage to be carried out, originating from user-clients Ci who are able to communicate directly with the central processing unit (UC), for example via the telephone-communication network, or directly with one of the terminals Bi, and particularly with a terminal located close to the place where a parcel, envelope or article to be carried is to be collected or picked up.

Each client Ci may belong to two principal client categories.

The first category comprises established clients who are identified by the service provider who has at his disposal, in the central unit's memory, all the data relating to these clients in the first category and with regard to whom the service provider carries out an invoicing operation with a view to subsequent payment for the carriage carried out on behalf of these clients.

The client may also belong to a second category of clients who are "unknown" to the service provider and who, for the first time, transmit to the service provider an order for carriage to be carried out, this second category also including clients who do not have sufficient orders to be carried out to justify them being treated as subscribers, i.e. as clients belonging to the first category.

When a client belongs to this second category, he may access the network only by transmitting his order to the central processing unit (UC), which analyzes the order and directly indicates the price of carriage to him. The client then immediately makes the relevant payment, for example by means of remote payment, this type of operation today being made particularly simple via, for example, the use of a "Minitel" terminal, which makes it possible to carry out a remote-payment operation using a bank card.

Irrespective of the category to which the client Ci belongs, the order he has to be carried out conventionally comprises information relating to the parcel-pickup address, the parcel-collection time, the delivery address and also the desired delivery time for the parcel.

The client also transmits information relating to the type of parcel to be carried, i.e. relating to its dimensions, its weight and/or supplementary information in the case of articles requiring special precautions for their carriage.

When an order is received by the central processing unit (UC), the various programs and software process the information received from the client and, after verification, the central unit transmits the order to be carried out to whichever terminal Bi is closest to the parcel-collection point.

The central processing unit (UC) also receives orders placed by clients who paid a subscription fee for access to a nearby terminal.

Figure 2:
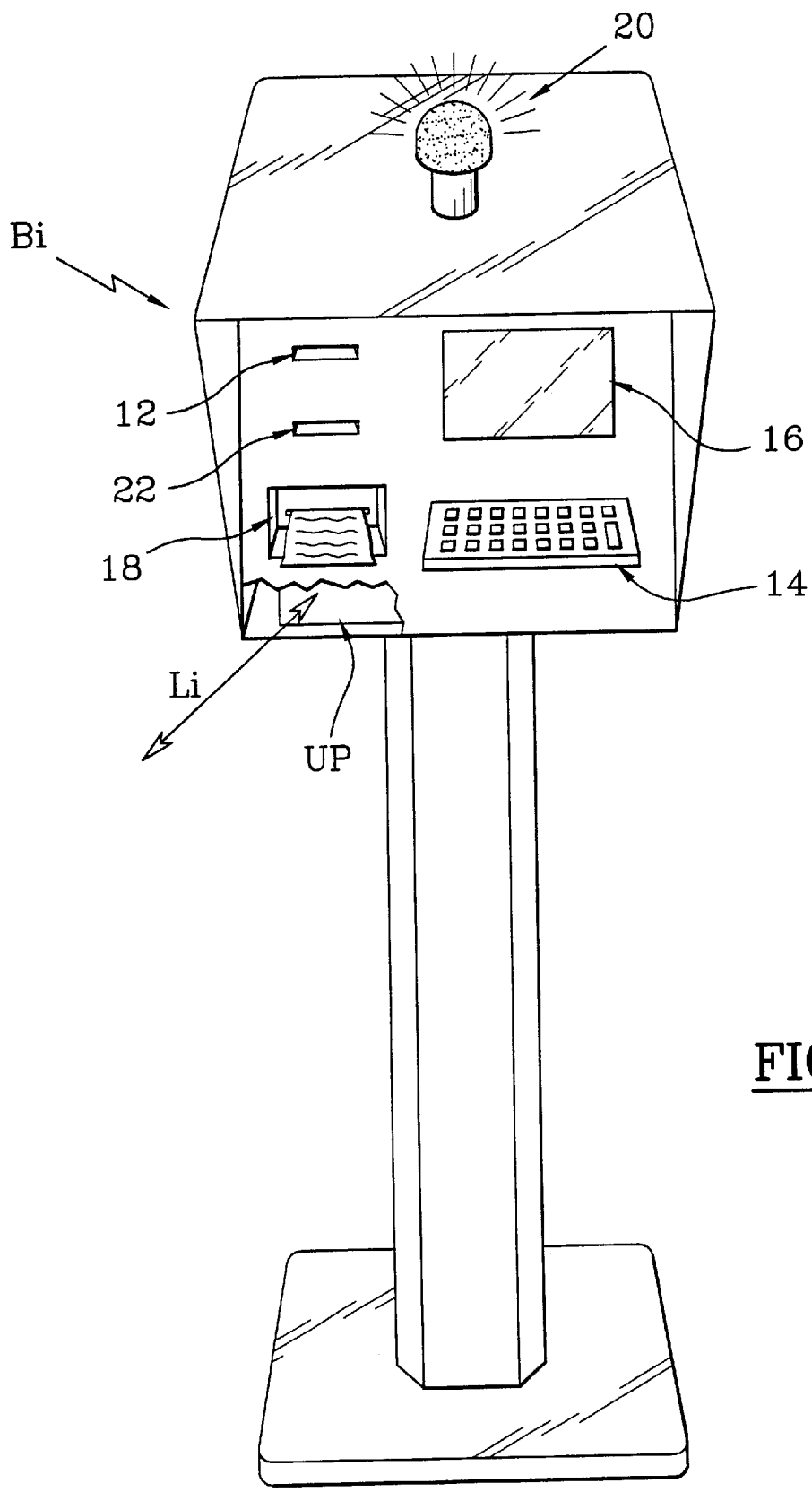
FIG. 2 is a diagram illustrating the design of a terminal forming part of the network of FIG. 1.

With reference to FIG. 2, a description will now be given of a diagrammatic, illustrative embodiment of a terminal Bi.

Each terminal Bi includes a peripheral processing unit (UP) which is permanently linked to the central processing unit (UC) via a line Li.

Each peripheral processing unit (UP) is also linked to the telecommunications network so that it can receive orders for carriage to be carried out directly from subscriber-clients belonging to the first category.

The terminal Bi includes means for reading and/or writing data appearing on a contact-type integrated-circuit card, these means being shown diagrammatically in the form of a slot 12 for the insertion of such a card into a read/write device incorporated in the terminal and linked to the peripheral processing unit (UP).

The terminal Bi includes a keyboard 14, a display screen 16 and a printer 18, all these components being linked to the peripheral processing unit (UP).

FIG. 2 also shows, diagrammatically, a warning light 20, which is visible from a distance, on the top of the terminal Bi, as well as a slot 22 for the insertion of a bank card into the terminal.

The carriage-service provider managing the network has at his disposal a fleet of carriers Ti for carrying out the orders received from the clients Ci.

Each carrier Ti is, in accordance with the teachings of the invention, an identified carrier approved for access to the network.

To this end, the carrier is provided with access to the network by being given, by the service provider, a contact-type integrated circuit card (not shown in the figures) on which various information and data capable of being processed by the network are stored.

Such information relates firstly to the identity of the approved carrier.

The card is actually issued to the carrier only after he has been approved by the service provider, the latter, in particular, having been able to verify the fact that the carrier requesting membership of the network fulfils the various legal and tax provisions relating to his corporate status, his professional insurance policies, the suitability of his vehicle, etc.

When all the above conditions have been fulfilled, the member-carrier Ti pays a fee for access to the network, in exchange for which the identification and access card is issued to him.

The identification and access card includes, in its memory, an indication of a number "n" of orders which the approved carrier will then be authorized to carry out as part of the network, his number of orders diminishing as the carrier uses his card.

It is also possible to enable the card to store the number of times access is gained to the network's terminals, it being possible for each instance of access to give rise to the approved carrier Ti taking charge of one or more orders to be carried out from the terminal in question.

Issue of the card storing the limited number of times the network or orders may be accessed is therefore subject to prior payment of the relevant subscription fee by the carrier in question.

When a card's allowance has been used up, i.e. when this card no longer stores any rights of access to orders managed by the network, the carrier must purchase a new card from the service provider or has, for example, the opportunity of "reloading" his card directly form a terminal by inserting it into the slot 12 while also inserting a bank payment card into the slot 22 and then making a transaction request to the central unit UC via the keyboard 14 which is linked to the peripheral unit UP which is itself linked to the central unit UC. Card reload may also be paid for by automatic deduction of the relevant amount from the carrier's supplier account held by the network manager.

The screen 16 makes it possible to display various questions and comments relating to this transaction.

Depending on the type of vehicle or vehicles at the disposal of an approved carrier Ti, enabling him only to offer carriage in certain categories, this carrier's identification and subscription card may include information relating to the type of carriage he is able to carry out, information which will, at the time of each connection with a terminal, be processed by the network in order to restrict the carrier's access only to orders for carriage which he will technically be able to carry out.

A description will now be given of the way in which the network operates and, in particular, of the complete processing of an order for carriage.

The orders for carriage received by the network are, as mentioned above, received directly by the central unit (UC) or by the terminals Bi.

Processing and geographical distribution, by the central unit UC, of the orders to be carried out gives rise to the transmission, via the lines Li, of orders Oi distributed to the various terminals Bi.

Therefore, the peripheral processing unit UP of a terminal Bi receives orders Oi to be carried out which it stores and can display on its screen 16 at the request of an approved carrier.

Display takes place, for example, according to the chronological order of receipt of the orders Oi by a terminal Bi.

As may be seen in FIG. 1, the terminal B2 therefore stores, for example, orders 01, 08 and 012.

When a terminal Bi has orders to be carried out in stock, the warning light 20 is, for example, lit up to alert approved carriers close to the terminal Bi to the presence of such orders to be carried out.

The first carrier to present himself in front of. the terminal Bi inserts his identification card into the slot 12.

After his identity has been recognised by the peripheral unit UP which is linked to the central unit UC, the carrier is able, via the screen 16, to access the list of orders to be carried out corresponding to the carriage categories for which he is authorized.

On the basis of the list displayed on the screen 16 and by means of the keyboard 14, the carrier selects one or more orders which he has decided to carry out.

For each order selected and validated by the carrier, the terminal Bi issues him, via the printer 18, with a carriage-order slip which includes all the technical data relating to carriage mentioned above, as well as an encoded version of such information and data, for example in the form of a bar code. A different slip is printed and issued for each order selected.

When the operations of selecting orders and issuing slips have been completed, the carrier removes his identification card whose quota "n" has been reduced in accordance with the network's management principle.

The carrier leaves the terminal in order to carry out the orders he has selected and for each of which he has a slip.

Several copies, preferably four copies, of each slip are issued and printed.

Conventionally, for each order, the carrier takes delivery of the parcel or of the goods to be carried at the collection address, at the premises of the client who has placed the order or at the premises of a collection client to whom he gives a first copy of the slip indicating the actual pickup time, and then he carries and delivers the parcel or goods to a delivery client to whom he gives a second copy of the slip after having indicated the actual delivery time.

Once the errand has been carried out, the messenger retains two copies of the slip.

A third copy is intended for sending back or transmitting, by post or by data-transmission means, to the service provider managing the network so that the latter subsequently pays the carrier for the errands carried out, it being possible for the fourth copy of the slip to be retained by the carrier for subsequent accounts verifications.

On the basis of the carriage slips returned to him, the service provider can automatically and by computer, and also in a highly simplified manner by reading the bar codes, process the various operations, for accounts purposes, with a view, in particular, to obtaining payment from clients and making payments to the various members of his carrier fleet.

When a client transmits his order directly to the central unit UC, the latter's management of his order, particularly with a view to selecting the nearest terminal or a terminal which is further away but "less laden" with orders, takes place without this processing being referred to the client, so as to carry out his order as efficiently as possible.

When a client places his order directly at a terminal, in the event that, for example, the client C4 places his order at the terminal B4 in FIG. 1, the central unit UC to which the peripheral unit of the terminal B4 is linked may, after processing and analysis, decide to distribute the order to another terminal depending on how loaded the terminal B4 is or depending on the actual pickup address, which may be located nearer to another terminal.

Generally speaking, when a terminal is loaded with orders to be carried out and the central unit detects this fact, the management software redistributes certain orders to other terminals in the network so that orders can be taken on by carriers more quickly.

The design of the network also makes it possible to process orders which have been received but whose pickup addresses are too far from one of the network's terminals, it being possible for the central unit then to place the orders received directly with approved carriers located close to the pickup addresses.

The central unit also monitors the smooth running of the terminals and, in particular, the status of the printers, and it can trigger maintenance operations with a view, in particular, to reloading a terminal with blank slips.

The various methods of creating links and of communicating between the terminals Bi and the central unit UC, and also between the clients and such elements, are not limited to those which have been described.

I claim:

1. A network for distributing and managing orders (Oi) for carriage issued by user-clients (Ci) and carried out by carriers (Ti) comprising: a central processing unit (UC) linked to the users (Ci) for receiving orders (Oi) for carriage to be carried out, managing orders received and, distributing orders to various terminals (Bi) distributed geographically, each one of said various terminals being linked (Li) to the central processing unit (UC) or to the users (Ci) and comprising:

a peripheral processing unit (UP) linked to the central unit (UC);

means for identifying approved carriers (Ti) capable of carrying out the orders (Oi);

means (14) for exchange of data between the terminal (Bi) and the approved carriers (Ti);

means (16) for displaying one or more orders (Oi) for carriage to be carried out; and, means (18) for printing and issuing, to an approved carrier (Ti), slips corresponding to orders for carriage to be carried out by this carrier;

wherein said means for identifying, said means for exchange, said means for displaying and said means for printing and issuing are linked to the peripheral processing unit (UP).

2. The network as claimed in claim 1, wherein the identification means include a device (12) for reading or writing data on a contact-type integrated-circuit identification card held by each approved carrier (Ti).

3. The network of claim 1, wherein each terminal (Bi) includes means (20), which are visible from a distance, for bringing attention to the existence of at last one order for carriage to be carried out from this terminal.

4. The network of claim 1, wherein the means for exchange of data include a keyboard (14) enabling an identified approved carrier to select at least one of the orders to be carried out which are displayed on the terminal (Bi) and to command the issuing of a slip relating to this order.

5. The network of claim 1, wherein the means for exchange of data enable an approved carrier to communicate with the central processing unit (UC), particularly in order to issue messages to the central processing unit or a user-client.

6. The network of claim 1, wherein the display means (16) include a screen for displaying the orders for carriage to be carried out, particularly in chronological order of receipt of the orders received by the peripheral processing unit (UP), with, in particular, for each order:

the pickup address and time;

the delivery address and time;

an indication of the nature of the carriage, particularly of a category of dimensions or of weight to which a parcel to be carried belongs or of a type of vehicle required for carriage.

7. The network of claim 1, wherein each slip relating to an order for carriage to be carried out includes at least the following information:

the identity of the approved carrier who carries out the order for carriage;

the identity of the user-client issuing the order;

the delivery address and time;

an indication of the type of carriage;

particularly in the form of a bar code, with a view to facilitating processing of the information by the body managing the network, after the order has been carried out by the carrier.

8. The network of claim 6, wherein the identification of an approved carrier includes data relating to the type of carriage he is authorized to carry out.

9. The network of claim 8, wherein the peripheral processing unit is adapted to select and display orders to be carried out which correspond to carriage for which the approved and identified carrier is authorized.

10. A system for distributing and managing orders for carriage issued by clients and carried out by carriers, said system comprising a central processing unit linked to the clients for receiving said orders, managing said orders received, and distributing said orders received to at least one of a plurality of geographically distributed terminals, each of said plurality of terminals comprising:

a peripheral processing unit linked to said central processing unit;

means for identifying approved carriers selected from said carriers and each being capable of carrying out at least one of said orders received, said means for identifying comprising a device for reading data on a contact-type integrated-circuit identification card held by each approved carrier;

means for exchanging data between the terminal and at least one of said approved carriers;

means for displaying one or more orders received for carriage to be carried out; and, means for printing and issuing, to a select one of said approved carriers, slips corresponding to orders for carriage to be carried out by said select one approved carrier;

wherein said means for identifying, said means for exchange, said means for displaying and said means for printing and issuing are linked to the peripheral processing unit; and, wherein each identification card includes data relating to the identity of the approved carrier holding the card and data relating to the number of times of access to the terminals which the carrier has had or to a number of orders which the carrier is still authorized to carry out under the terms of a prior subscription payment made by the carrier to the body managing the network.

* * * * *